Dec. 11, 1934.  W. E. WEBB  1,984,293
VEHICLE STEERING WHEEL
Filed April 4, 1933  2 Sheets-Sheet 1
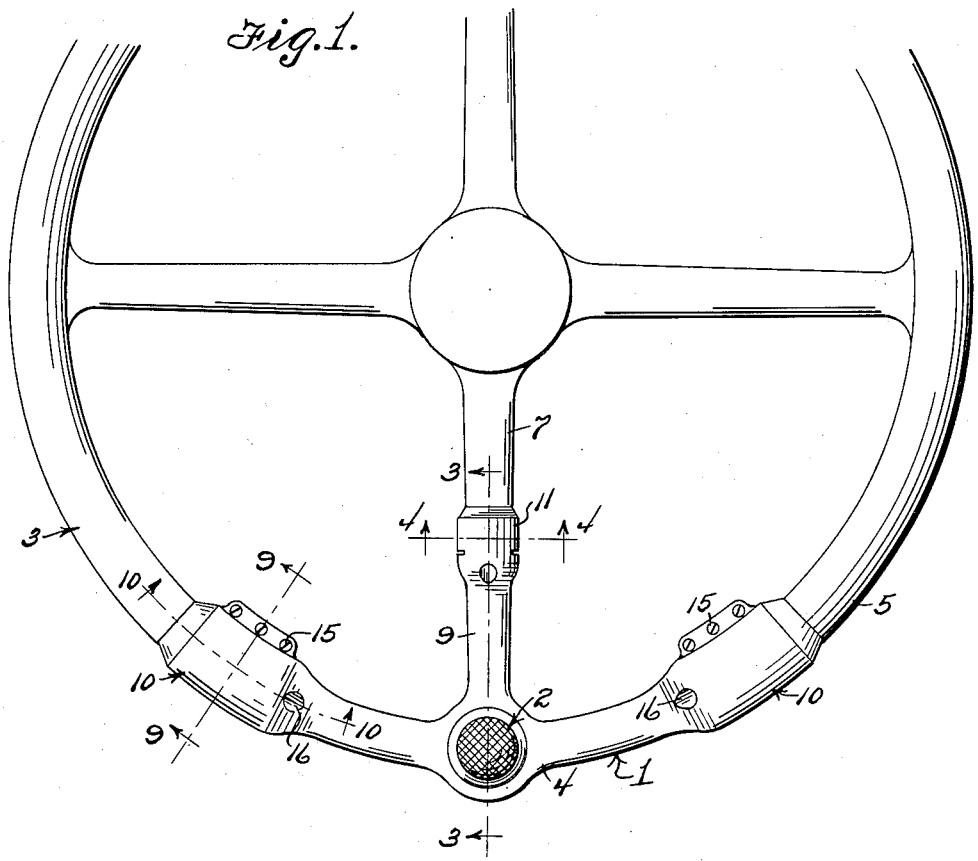
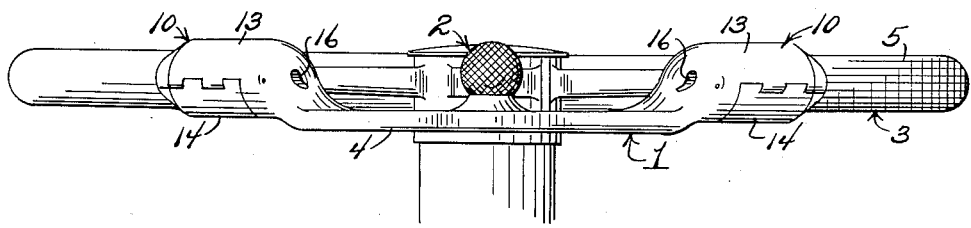
William E. Webb
INVENTOR
BY Victor J. Evans & Co.
ATTORNEY Dec. 11, 1934. W. E. WEBB 1,984,293
VEHICLE STEERING WHEEL
Filed April 4, 1933 2 Sheets—Sheet 2
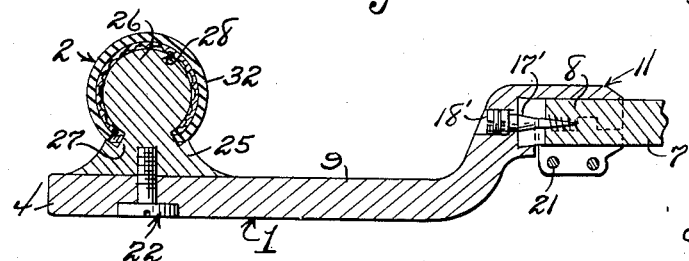
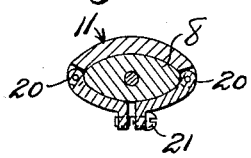
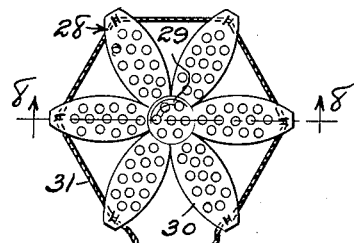
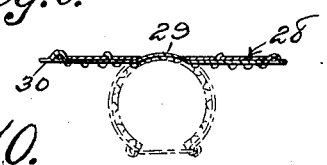
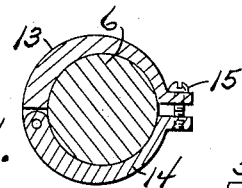
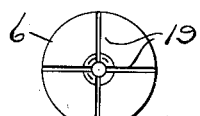
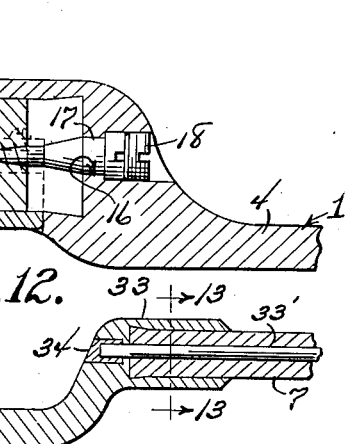
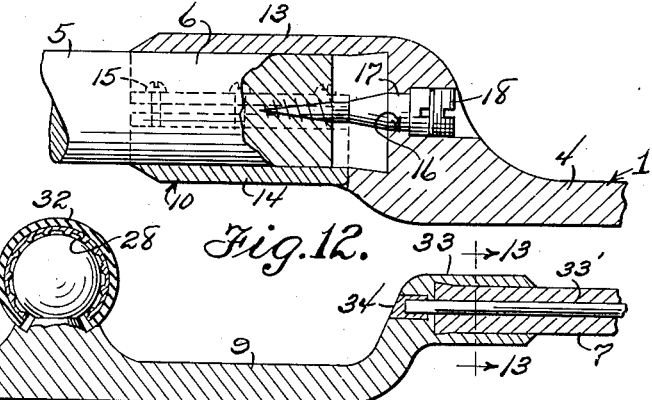
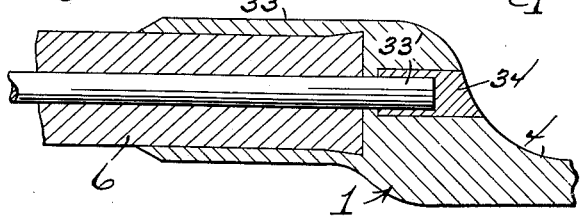
William E. Webb
INVENTOR
BY Victor J. Evans & Co.
ATTORNEY

UNITED STATES PATENT OFFICE 1,984,293

VEHICLE STEERING WHEEL

William E. Webb, Minneola, Fla.

Application April 4, 1933, Serial No. 664,409

3 Claims. (Cl. 74—557)

This invention relates to a steering wheel for any type of motor vehicle and of the character set forth in my co-pending application Serial No. 605,725 and has for the primary object, the provision of a mounting for the means employed to facilitate the turning of the steering wheel in either direction by a person and especially when it is desired to turn the steering wheel rapidly for negotiating an abrupt or short turn with the vehicle and the mounting so positioning said means that the latter will not interfere with the gripping or turning of the wheel in the conventional manner and also protect such means from injury by being struck unintentionally.

Another object of this invention is the provision of a substantially T-shaped mounting for the finger grip which may be applied to the steering wheel either during the manufacture thereof or at any time after placing the wheel in use and which will maintain itself in proper alinement with the rim of the wheel as well as retaining the ends of the merger portion of the rim in alinement with each other and against flexation with respect to the remaining portion of the rim.

A further object of this invention is the provision of an improved finger grip and securing means therefor to the mounting and said grip is so constructed that it may be easily and quickly gripped and will be self-lubricating and adapted to take up wear between certain parts thereof to prevent rattling and undesirable noise therefrom.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a fragmentary plan view illustrating a steering wheel constructed in accordance with my invention.

Figure 2 is a fragmentary side elevation illustrating the same.

Figure 3 is a sectional view taken on the line 3—3 of Figure 1.

Figure 4 is a sectional view taken on the line 4—4 of Figure 1.

Figure 5 is a bottom plan view illustrating a fastener.

Figure 6 is a side elevation illustrating the fastener employed for securing the base of the finger grip to the mounting.

Figure 7 is a plan view illustrating a lining for the finger grip.

Figure 8 is a sectional view taken on the line 8—8 of Figure 7.

Figure 9 is a sectional view taken on the line 9—9 of Figure 1.

Figure 10 is a sectional view taken on the line 10—10 of Figure 1.

Figure 11 is an end view illustrating one of the ends of the rim of the steering wheel.

Figure 12 is a fragmentary sectional view illustrating a modified form of mounting and finger grip and its attachment to the spoke of the steering wheel.

Figure 13 is a sectional view taken on the line 13—13 of Figure 12.

Figure 14 is an enlarged fragmentary sectional view of the modified form illustrating the connection between the mounting and one of the ends of the rim of the steering wheel.

Referring in detail to the drawings, the numeral 1 indicates a mounting for a finger grip 2 to a steering wheel 3 either during the manufacture of the latter or after the sale or use of the steering wheel. The mounting 1 is of substantially T-shape in which the head 4 thereof is arcuately curved to conform or provide a continuation of the rim 5 of the steering wheel 3 when applied thereto. The rim 5 of the steering wheel has a section removed therefrom presenting ends 6 to the rim and one of the spokes 7 of the steering wheel is cut off to present an end 8. The ends of the mounting are constructed for attachment to the ends of the rim and the shortened spoke of the steering wheel, as shown in Figure 1. The mounting 1 besides including the head 4 also has a stem 9 and the end portions of the head 4 are enlarged and offset from the major portion of said head and provide clamps 10 to receive and grip the ends 6 of the rim 5. A clamp 11 forms an integral part of the stem 9 of the head 1 and is offset from the stem to receive the end 8 of the spoke of the steering wheel. The stem 9 being attached to the spoke of the steering wheel forms a stabilizer to maintain the head 4 in alinement with the ends 6 of the rim 5 and is adapted to prevent twisting of the head out of position when subjected to excessive strain.

The clamps 10 and 11 being offset from the major portion of the head 4 and when applied to the rim 5 and spoke of the steering wheel dispose the major portion of the head in a plane below the upper surface of the rim and forms between the clamps 10 a depression or recess in which is located a finger grip 12 so that the latter is substantially confined within the depression and thereby protected from injury or from catching into a person's garment during the use of the steering wheel in a conventional manner. However, it so so positioned that it may be readily grasped when desiring to turn the steering wheel by the finger grip. The finger grip is preferably located on the head 4 where the stem 9 merges with the head thereby positioning the finger grip intermediate the ends of the head and in alinement with the shortened spoke of the steering wheel.

Each clamp 10 includes a rigid section 13 and a hinged section 14, the sections 13 and 14 cooperating in forming an open end socket having diameters of different sizes, as shown in Figure 10. One edge of the section 14 is hinged to one edge of the section 13, while the other edges of said sections are detachably connected by fasteners 15 so that the clamp may be opened to permit the insertion of one of the ends 6 of the rim 5. The clamp is provided with a bore or opening 16 communicative with the socket of the clamp and extending through the closed end of the clamp for the purpose of receiving an expanding screw or element 17, the latter being retained in the bore by a set screw 18. After the section has been removed from the rim 5, the ends 6 and the shortened spoke are slotted or bifurcated, as shown at 19, in Figure 11 to receive the expanding screws 17 so that when the latter are turned home the bifurcated portions of the rim and spoke will be caused to expand against the walls of the clamps and become wedged therein to prevent accidental removal of the clamps from the wheel. The walls of the sections 13 and 14 of the clamps 10 taper towards their free edges so that said sections may readily flex to conform to the contour of the ends of the rim when applied thereto and still provide the clamps with desired rigidity. The detachable edges of the sections 13 and 14 are disposed inwardly of the rim 5 so as not to obstruct or catch into the garment of the person using the steering wheel.

The clamp 11 which receives the end 8 of the shortened spoke of the steering wheel is preferably constructed from three sections, one section formed integrally with the stem 9 and the other sections hinged thereto, as shown at 20, and detachably connected by fasteners 21. Due to this construction the clamp 11 may be readily placed about the shortened spoke and firmly secured thereto by adjusting the fasteners 21.

The bifurcated end of the spoke is expanded by a screw 17' similar to the screw 17 and is locked in place by a set screw 18'.

A fastener 22, including a head 23 and a threaded stem 24 has the head 23 embedded in the head 4 of the mounting 1 with the stem 24 extending upwardly from the upper surface of the head to be threaded into a socket formed in a base 25 of the finger piece 2. Formed integrally with the base 25 is a globule shaped core 26 and a groove 27 is located in the base where the latter merges into the core 26. A lining 28 of a suitable material impregnated with a lubricant is mounted on the core 26 and includes a central portion 29 having radially extending scalloped portions 30 integral therewith and to which is slidably secured a draw string 31. The lining fits about the core with the ends of the scalloped portions and draw string lying within the groove 27. By adjusting the draw string the lining may be caused to conform to the contour of the core. An elastic cover 32 fits over the lining and extends into the groove 27. The cover is rotatable relative to the core and the lining reduces friction between these parts by maintaining them thoroughly lubricated and also said lining compensates for the wear between said parts and may be adjusted when necessary.

As shown in Figures 12 to 14 of the drawings, the mounting or the head thereof may be provided with socketed offset ends 33, each having a bore of different diameters with an opening communicative with the bore. The socketed ends are similar to the respective clamps 10 and 11 except they are not sectional. During the molding or forming of the wheel, the ends of the steering wheel and shortened spoke are positioned in the respective socket ends of the mounting and the reinforcing elements 33' of the rim extend into the openings and are suitably anchored therein, as shown at 34, by pouring lead into said openings.

The base of the finger piece may form an integral part of the head, as shown in Figure 12.

A mounting constructed in accordance with the foregoing description and shown in the drawings when incorporated in a steering wheel will withstand severe strains and will maintain its proper positions with respect to the rim of the wheel and will so position the finger grip that the latter may be conveniently grasped when desiring to use the same and will prevent the finger grip from catching into the garments of a person using the steering wheel and further protect the finger piece from injury. The mounting besides being of a mechanically efficient construction will in no way deface or take away from the ornamental appearance of the steering wheel and provides a device which may be easily and quickly applied to a steering wheel either when the wheel is in use or during the manufacture thereof. It will also be noted that when the device has been once applied to a steering wheel it will remain attached thereto until manually removed and also the device will be free of manual attention or adjustment during the use thereof and will be self-lubricating and free from noises or rattling.

While I have shown and described the preferred embodiment of my invention, it will be understood that minor changes in the construction, combination and arrangement of parts may be made without departing from the spirit and scope of my invention, as claimed.

Having described the invention, I claim:

1. A finger grip comprising a globule-shaped core, a base for said core and having a groove lying in close proximity to the core, a lubricant applying lining mounted on the core and received in the groove, and a finger piece overlying the lining and received in the groove.

2. A finger grip comprising a base having a groove, a core on said base, an adjustable lubricant and wear compensating lining covering the core and having edges thereof disposed in the groove, and an elastic cover positioned over the lining and having the edges thereof received in the groove.

3. A finger grip comprising a base having a groove, a core on the base, a lining on the core and having scalloped portions with the ends thereof terminating in the groove, means connecting the ends of the scalloped portions and securing them in the groove, and a cover disposed over said lining.

WILLIAM E. WEBB.